(12) United States Patent
Kinner et al.

(10) Patent No.: US 10,974,162 B2
(45) Date of Patent: Apr. 13, 2021

(54) PLANT FOR DEALCOHOLISING ALCOHOLIC BEVERAGES

(71) Applicant: GEA WIEGAND GMBH, Ettlingen (DE)

(72) Inventors: Frank Kinner, Ettlingen (DE); Kai Stoeßel, Rheinstetten (DE)

(73) Assignee: GEA WIEGAND GMBH, Ettlingen (DE)

(*) Notice: Subject to any disclaimer, the term of this patent is extended or adjusted under 35 U.S.C. 154(b) by 522 days.

(21) Appl. No.: 15/848,162

(22) Filed: Dec. 20, 2017

(65) Prior Publication Data
US 2018/0179480 A1 Jun. 28, 2018

(30) Foreign Application Priority Data
Dec. 22, 2016 (EP) .................................... 16206214

(51) Int. Cl.
*B01D 3/14* (2006.01)
*B01D 3/00* (2006.01)
(Continued)

(52) U.S. Cl.
CPC ........... *B01D 3/002* (2013.01); *B01D 1/2846* (2013.01); *B01D 3/007* (2013.01); *B01D 3/08* (2013.01);
(Continued)

(58) Field of Classification Search
CPC ...... B01D 1/2846; B01D 3/002; B01D 3/007; B01D 3/08; B01D 3/148; B01D 3/322;
(Continued)

(56) References Cited

U.S. PATENT DOCUMENTS 3,968,002 A * 7/1976 Standiford ............... B01D 1/26
159/13.2
4,559,108 A * 12/1985 Ahlberg ............... B01D 1/2806
202/154

(Continued)

FOREIGN PATENT DOCUMENTS

EP 0965373 12/1999
WO 2013037712 3/2013

OTHER PUBLICATIONS

T.O. Omideyi et al.: "The economics of heat pump assisted distillation systems—I. A design and economic model", Journal of Heat Recovery Systems, Bd. 4, Nr. 3, 1. Jan. 1984.

(Continued)

*Primary Examiner* — Jonathan Miller
(74) *Attorney, Agent, or Firm* — Rankin, Hill & Clark LLP

(57) ABSTRACT

A plant for dealcoholising alcoholic beverages includes a rectification column having at least one inlet for the alcoholic beverage, a sump and a top. The rectification column is operable such that dealcoholised beverage can be removed from the sump and exhaust vapour can be removed from the top. At least one evaporator is configured to supply the rectification column with vapour. A condenser arrangement condenses the exhaust vapour removed from the top of the rectification column, at least in part. The plant further includes a heat pump which can operate the evaporator as well as the condenser arrangement. A method for dealcoholising alcoholic beverages in a rectification column is also disclosed.

8 Claims, 2 Drawing Sheets

(51) Int. Cl.
*B01D 5/00* (2006.01)
*B01D 19/02* (2006.01)
*B01D 19/00* (2006.01)
*B01D 3/32* (2006.01)
*C12H 3/02* (2019.01)
*B01D 1/28* (2006.01)
*B01D 3/08* (2006.01)

(52) U.S. Cl.
CPC .............. *B01D 3/148* (2013.01); *B01D 3/322* (2013.01); *B01D 5/006* (2013.01); *B01D 5/0009* (2013.01); *B01D 5/0012* (2013.01); *B01D 5/0039* (2013.01); *B01D 5/0069* (2013.01); *B01D 5/0084* (2013.01); *B01D 19/0021* (2013.01); *B01D 19/02* (2013.01); *C12H 3/02* (2019.02); *B01D 2221/06* (2013.01); *Y02B 30/52* (2013.01)

(58) Field of Classification Search
CPC .. B01D 5/0009; B01D 5/0012; B01D 5/0039; B01D 5/006; B01D 5/0069; B01D 5/0084; B01D 19/0021; B01D 19/02; C12H 3/02
See application file for complete search history.

(56) References Cited

U.S. PATENT DOCUMENTS

| | | | | |
|---|---|---|---|---|
| 4,961,826 A * | 10/1990 | Grethlein | ............. | B01D 1/2856 202/154 |
| 5,252,187 A * | 10/1993 | Ohtsu | ...................... | B01D 1/26 159/24.2 |
| 5,386,075 A * | 1/1995 | Keil | ...................... | B01D 1/2856 585/800 |
| 6,589,395 B1 * | 7/2003 | Meili | ...................... | B01D 3/007 165/108 |
| 7,981,256 B2 * | 7/2011 | Wegerer | ...................... | C07C 7/04 203/26 |
| 8,182,654 B2 * | 5/2012 | Sechrist | ................... | B01D 3/14 203/26 |
| 8,440,056 B2 * | 5/2013 | Nakaiwa | ................ | B01D 3/322 202/154 |
| 9,045,697 B2 * | 6/2015 | Sadler | ................... | B01D 3/007 |
| 9,908,060 B2 * | 3/2018 | Wakabayashi | ......... | B01D 3/143 |
| 10,022,648 B2 * | 7/2018 | Maedebach | ............ | B01D 3/007 |
| 10,272,358 B2 * | 4/2019 | Kishimoto | ............... | B01D 3/32 |
| 10,315,971 B2 * | 6/2019 | King | ...................... | B01D 1/2843 |
| 2014/0339069 A1 * | 11/2014 | Maedebach | ............ | B01D 3/007 202/159 |
| 2015/0202546 A1 * | 7/2015 | Filippi | .................... | C07C 31/04 203/25 |
| 2015/0226464 A1 | 8/2015 | Kontomaris | | |
| 2017/0036138 A1 * | 2/2017 | Kishimoto | ............. | B01D 3/007 |
| 2018/0185766 A1 * | 7/2018 | King | ...................... | C07C 7/005 |

OTHER PUBLICATIONS

European Search Report filed in EP 16 20 6214 dated Jun. 1, 2017.

\* cited by examiner

PLANT FOR DEALCOHOLISING ALCOHOLIC BEVERAGES

The present invention relates to a plant for dealcoholising alcoholic beverages, comprising a rectification column with at least one inlet for the alcoholic beverage, a sump and a top, the rectification column being operable such that dealcoholised beverage can be removed from the sump and exhaust vapour can be removed from the top, at least one evaporator which is configured to supply the rectification column with vapour, and a condenser arrangement for condensing the exhaust vapour removed from the top of the rectification column at least in part.

Due to a recently intensified health awareness, there is a recognisable market trend for alcohol-free or low-alcohol beverages. For example, in recent years, a significant increase can be noted in the sales of dealcoholised beer and wine. These types of beverages are produced in that sugary or starchy starting products firstly undergo an alcoholic fermentation and are then dealcoholised. Since the mentioned beverages contain a large number of flavours which develop not least during the alcoholic fermentation, the dealcoholisation process should be carried out as carefully as possible to adversely affect the taste of the beverage as little as possible.

Rectification columns are used in known plants for dealcoholising alcoholic beverages, into which columns the alcoholic beverage is fed after being preheated and optionally degassed. Degassing is particularly necessary in the case of carbonated beverages, such as beer, to prevent the beverage from frothing up in the rectification column. The alcohol is separated out of the beverage in the stripping section of the rectification column, and the then dealcoholised beverage collects in the sump of the column, while the alcohol rises into the top of the column as exhaust vapour.

If appropriate, it is possible to connect to the rectification column a concentrating part in which the alcohol contained in the exhaust vapour is strengthened to a higher concentration. The alcohol exhaust vapour concentrated thus which, furthermore, can also contain flavours removed together therewith from the alcoholic beverage is condensed in a condenser arrangement. In known plants, a cooling medium is used in the condenser, to which cooling medium the condensing exhaust vapour releases its condensation energy, and which is cooled to the temperature required for this purpose by means of a refrigerating machine.

In contrast thereto, an evaporator is operated on or in the sump of the column to generate the vapours or exhaust vapours required for the rectification. This evaporator is usually heated by live steam or hot water. Thus, considerable amounts of energy are required at each of two points in the known plants, namely for the condensation of the alcohol exhaust vapours and for heating the evaporator associated with the rectification column. Depending on the size and temporal throughput of the plant, the total power to be applied for this purpose is a significant cost factor during continuous operation.

It is therefore the object of the present invention to provide a generic plant for dealcoholising alcoholic beverages, which is distinguished by an increased energy efficiency and thus by a cost-saving operation.

To achieve this object, the plant according to the invention for dealcoholising alcoholic beverages further comprises a heat pump which can operate the at least one evaporator as well as the condenser arrangement. The provision, according to the invention, of the heat pump, makes it possible to use the heat generated during the condensation of the alcoholic exhaust vapour to operate the evaporator, which is advantageously reflected in the overall energy balance of the plant.

In a possible embodiment, the plant according to the invention further comprises for this purpose a heating circuit, containing a heating medium, for heating the evaporator and comprises a cooling circuit, containing a cooling medium, for cooling the condenser arrangement, the heat pump being operable here to transfer the heat from the cooling medium leaving the condenser arrangement to the heating medium leaving the evaporator.

This constructional measure creates two separate circuits which are thermally coupled together by the heat pump and by the evaporating and condensing exhaust vapour and the overall energy balance of which must be balanced in continuous operation in order to be able to ensure a stable operation of the plant. The thermal output which is input into the heating circuit by the waste heat of the heat pump, due to the construction thereof, must in some circumstances be removed again from the plant in a different location.

This could be performed, for example, in that the dealcoholised beverage is removed from the plant at a higher temperature than that at which the alcoholic beverage is introduced into the plant. However, since it is advantageous for reasons of storage quality and for the careful processing of the beverage to supply this beverage and also to remove it from the plant at the lowest possible temperature, the additional thermal energy input into the plant by the heat pump is preferably removed by other measures. For example, for this purpose it is possible to associate with the heating circuit and/or with the cooling circuit at least one heat exchanger which can remove heat from the plant. This heat exchanger can be configured, for example, such that cooling water circulates therein, which cooling water cools the heating medium leaving the evaporator before the heating medium is fed to the heat pump.

In an alternative embodiment, the plant according to the invention can be configured such that the heat pump comprises a mechanical exhaust vapour compressor which is arranged to compress exhaust vapour removed from the top of the rectification column and to feed it as heating medium to the evaporator, so that the evaporator also forms at least one part of the condenser arrangement.

In this embodiment of a plant according to the invention, the heating circuit and the cooling circuit can be omitted. Furthermore, as already mentioned, at least one part of the condenser arrangement is also formed by the evaporator, so that here as well, it is possible to make savings in the construction of the plant according to the invention. Known devices can be used as the mechanical exhaust vapour compressor, for example radial ventilators, turbocompressors or Roots blowers. The power of the mechanical exhaust vapour compressor can be controllable or regulatable during operation to adjust the overall energy balance of the plant. It is found that the use of a mechanical exhaust vapour compressor is advantageous in terms of energy and economic operation, particularly in large plants with a high beverage throughput.

Although during continuous operation of the plant according to the invention, due to the input of thermal energy by the heat pump, the overall energy balance of the plant tends to be such that heat must be removed from the plant by the heat exchanger mentioned above, it can be advantageous or even necessary, particularly when starting up or heating up the plant, to introduce heat into the plant from outside to bring the plant to its operating temperature. For this purpose, it is possible to associate with the heat pump, with the heating circuit and/or with the cooling circuit a heating device, for example a steam injector, which accordingly heats the exhaust vapour, the heating medium and/or the cooling medium.

If the heat exchanger mentioned above is provided for removing heat from the plant, and likewise if the heating device is provided, it can be advantageous to allocate the heat exchanger and the heating device to the same circuit, to the heating circuit or cooling circuit. In particular, an allocation to the heating circuit affords the advantages that on the one hand, the evaporator can come rapidly to its operating temperature by the heating and on the other hand, due to the removal of heat by the heat exchanger at the elevated temperature of the heating medium, this heat exchange can take place with an increased efficiency.

In a development of the plant according to the invention, said pant can comprise a compressor pump which is arranged to compress residual exhaust vapour which issues in gas form from the condenser arrangement. Using this compressor pump, it can be ensured that a vacuum prevails in the components of the plant which are located upstream, in particular in the rectification column, as a result of which the boiling points of the liquids to be evaporated are lowered and the outgassing of gases dissolved in the beverage is promoted.

In a preferred development, it is possible to arrange in the flow direction of the residual exhaust vapour downstream of the compressor pump a separator for separating liquid components of the residual exhaust vapour, and optionally also an aroma heat exchanger which is arranged to transfer heat from the liquid components of the residual exhaust vapour to the cooling medium. In the separator, gaseous components of the exhaust vapour, for example carbon dioxide, are separated from the remaining liquid aroma components. Since the aroma heat exchanger also releases its heat to the cooling circuit, it is possible to achieve an advantageous integration and a further improved energy efficiency, since it is possible to dispense with a separate cooling at this point. Alternatively, a cooling by means of a cooling water circuit or the like is naturally also conceivable.

Furthermore, the plant according to the invention can comprise in the flow direction of the alcoholic beverage upstream of the inlet of the rectification column at least one device for preheating the alcoholic beverage, optionally a heat exchanger which is arranged to transfer heat from the dealcoholised beverage to the alcoholic beverage, and/or a heat exchanger which is configured to transfer heat from the heating medium to the alcoholic beverage. As mentioned above, the alcoholic beverage is usually delivered in a cooled state to the plant. For this reason, it is desirable to preheat the alcoholic beverage to ensure that the process takes place correctly and efficiently in the rectification column. Since this preheating takes place against the dealcoholised beverage removed from the sump of the column at an elevated temperature, some of the thermal output applied in the column can be recovered. Furthermore, a preheating by means of the heating medium circulating in the heating circuit increases the degree of integration of the entire plant, so that here as well, savings are possible. However, alternatively or additionally, it is naturally also possible to use other or further heat exchangers which are operated with an external heating medium, for example with live steam.

As also already mentioned, it is possible to provide in the flow direction of the alcoholic beverage upstream of the inlet of the rectification column a degassing device which preferably comprises a separator, in which case the degassing device is optionally connected to the condenser arrangement such that the gases outgassed from the alcoholic beverage can be fed together with the exhaust vapour removed from the top of the rectification column to the condenser arrangement.

While in known generic plants, it is usual to provide as degassing devices expansion tanks with installations for separating or destroying the resulting froth, or degasification tanks with a plurality of obliquely arranged degassing trays, over which the beverage to be degassed is guided, or nozzles, in a preferred embodiment of the present invention the degassing device can comprise a falling film tube bundle which can preferably be heated by a heating means. In this preferred embodiment of the degassing device, the beverage to be degassed is distributed uniformly over the tubes of the falling film tube bundle by a distributor device. The escaping carbon dioxide, together with the resulting exhaust vapour pulverises the froth in the downstream direction by its shear force. The liquid and the gas are finally separated from one another in the separator provided at the lower end of the falling film tube bundle.

In a preferred embodiment, the condenser arrangement of the plant according to the invention can comprise at least one horizontally arranged shell and tube condenser and/or at least one upright shell and tube condenser, and furthermore the condenser arrangement can preferably comprise firstly a horizontally arranged shell and tube condenser and then an upright shell and tube condenser in the flow direction of the exhaust vapour, in which case in particular the cooling medium can firstly flow through the upright shell and tube condenser and then through the horizontal shell and tube condenser.

However, alternatively or additionally, other types of condensers can also be used, for example plate condensers, thermo-plate condensers or mixing condensers.

Since the cooling medium firstly flows through the part of the condenser arrangement which is located downstream for the exhaust vapour and then through the upstream part of the condenser arrangement, it can be ensured that the cooling medium is at its lowest temperature in the last condenser stage, so that the desired operation of the condenser arrangement can be ensured.

The present invention also relates to a method for dealcoholising alcoholic beverages in a rectification column, to be preferably carried out in a plant according to the invention, dealcoholised beverage collecting in the sump of the rectification column and exhaust vapour collecting in the top of the rectification column, and furthermore the rectification column being supplied with vapour by an evaporator and the exhaust vapour from the top of the rectification column being condensed in a condenser arrangement.

In this case, the at least one evaporator and the condenser arrangement are operated according to the invention by a single heat pump. As stated above, the joint operation of the condenser arrangement and of the evaporator by a single heat pump provides advantages in terms of energy which are reflected in reduced operating costs of the plant.

While in known plants, the dealcoholised beverage is usually fed to the evaporator to generate therefrom the vapour required for rectification, according to the invention, water, for example brewing water, can preferably be evaporated in the evaporator. In this way, it is possible to reduce the residence time of the dealcoholised beverage in the plant at elevated temperature, so that the entire dealcoholisation process takes place in a particularly careful manner and the desired beverage quality can be ensured. The use of brewing water also ensures that the quality of the beverage is not impaired and at the same time, unavoidable losses of liquid in the rectification column can be immediately compensated.

Further features and advantages of the present invention will become apparent from the following description of two embodiments shown in the accompanying figures, in which.

Figure 1:
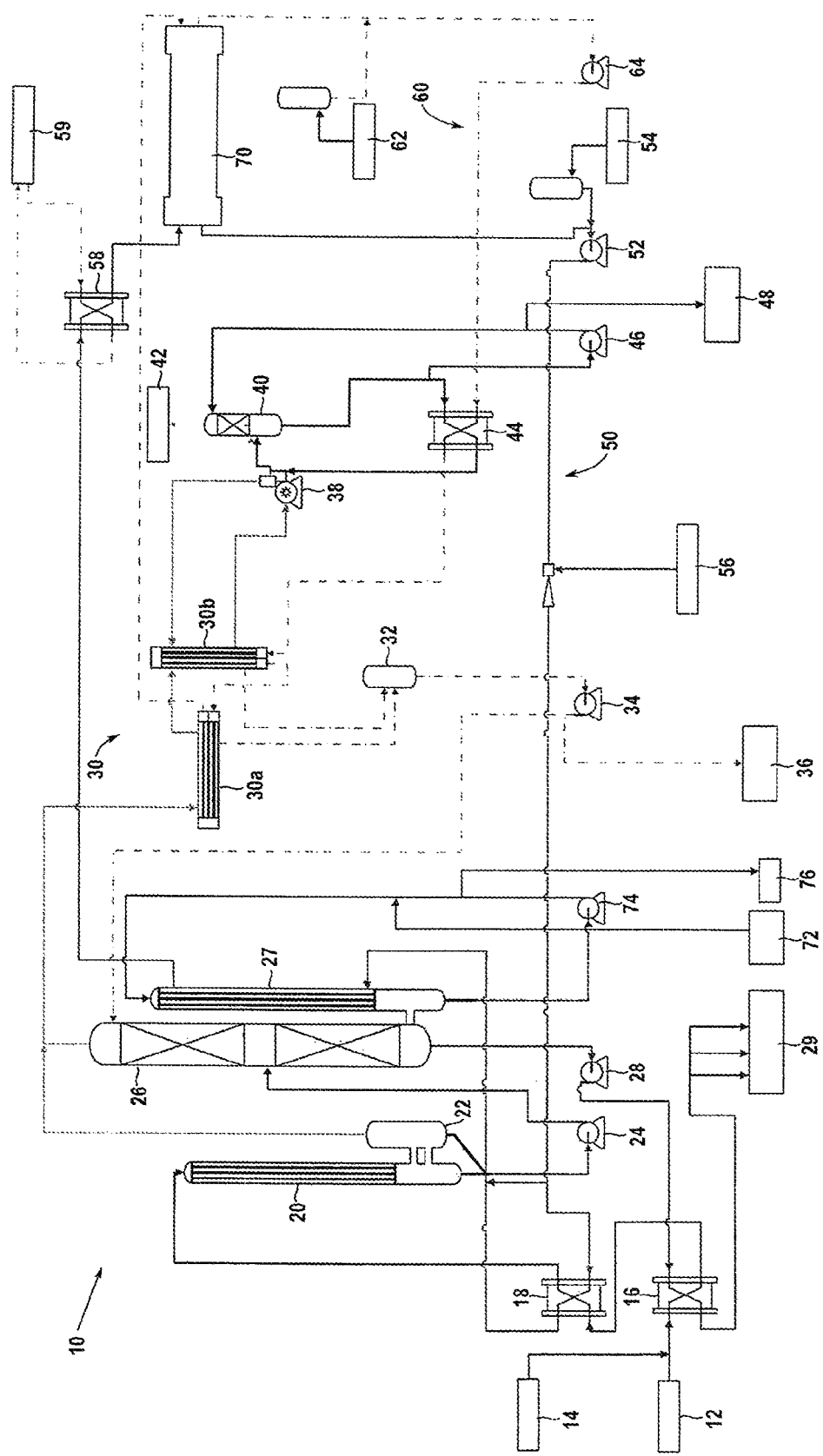
FIG. 1 shows a first embodiment of a plant according to the invention.

FIG. 1 schematically shows a first embodiment of a plant according to the invention for dealcoholising alcoholic beverages, which plant is denoted very generally by reference numeral 10 and can be used to dealcoholise beer, for example.

The alcoholic beverage is introduced into the plant 10 in a product feed 12, and at this stage usually has a relatively low temperature of typically 2° C., since said beverage is usually transported and delivered in a cooled state. Furthermore, delivered alcoholic beer contains 2.5%-8% (typically approximately 5%) of alcohol and 4-6 g/l of $CO_2$. Provided in parallel with the product feed 12 is a connection 14 for flushing water, by means of which the entire plant can be flushed for cleaning purposes.

The alcoholic beverage, introduced into the plant 10 through the product feed 12, initially passes through a first heat exchanger 16 and then through a second heat exchanger 18, in which heat exchangers said beverage is preheated in stages. After issuing from the second heat exchanger 18, the alcoholic beverage then passes at an elevated temperature into the degassing device 20 which is configured as a falling film tube bundle. In the degassing device 20, the alcoholic beverage is firstly distributed uniformly over the plurality of tubes of the falling film tube bundle, which can furthermore be heated from outside by a heating device (not shown). The $CO_2$ escaping from the beverage in the falling film tube bundle, together with the resulting exhaust vapour, pounds the resulting froth in the downstream flow by its shear force.

Furthermore, the degassing device 20 comprises a separator 22 in which the alcoholic beverage, which has now for the most part been degassed, and the gas are separated. The droplets of liquid separated in the separator 22 are pumped, together with the degassed alcoholic beverage collected in the sump of the degassing device 20, to a rectification column 26 by a first pump 24. The alcoholic beverage is fed to the middle part of the rectification column 26. The vapour required for rectification is generated by an evaporator 27 which is described further on.

In the rectification column 26, packings are typically provided as column installations for the separation procedure, however alternatively fillers or column trays can also be used in all kinds of configurations. By the effect of the compressor pump 38 which is described further on, a reduced pressure compared to the surroundings is generated in the interior of the rectification column 26, for example a pressure of 50 to 200 mbar, typically of approximately 100 mbar.

In the stripping part of the rectification column 26, the alcohol component is almost completely separated from the alcoholic beverage by the rising exhaust vapour. The beverage dealcoholised in this manner collects in the sump of the column 26 and, by setting construction and operating parameters, such as the height of the packed bed of the rectification column 26 and the energy used, and when the alcohol content of the alcoholic beverage which was fed in is known, it is possible to set the desired residual alcohol content of the dealcoholised beverage. Typically, residual alcohol contents of approximately 0 to 5000 ppm are possible, and residual alcohol contents of <500 ppm are typically set. The beverage which is degassed and dealcoholised in this manner and which is also at an elevated temperature due to the rectification procedure can be pumped out of the sump of the rectification column 26 by a second pump 28 and guided through the first heat exchanger 16, where it releases some of the heat which it has absorbed in the rectification column to newly fed-in alcoholic beverage so that the absorbed heat is transferred to the alcoholic beverage at least in part and thus continues to be used. Before the dealcoholised beverage is removed from the plant at reference numeral 29 and is transferred into storage tanks for example, further cooling stages can be provided to cool said beverage to a desired storage temperature, as well as a carbonisation process and further processes to enhance the flavour, such as a back-mixing of fresh beer or the addition of aroma components.

The exhaust vapour which collects in the top of the rectification column 26 is fed, together with the gaseous fraction separated in the separator 22, to a condenser arrangement 30 consisting of a first condenser stage 30a and a second condenser stage 30b. In this case, the first condenser stage 30a is configured as a horizontally arranged shell and tube condenser in which most of the alcohol contained in the exhaust vapour is condensed. This condensed alcohol is conveyed into a tank 32, from where it can either be removed from the plant at reference numeral 36 by a further pump 34 and further processed, or fed back into the top of the rectification column 26, as a result of which a concentrating effect up to an alcohol concentration of typically approximately 80% can be achieved.

The residual exhaust vapour which remains after the first condenser stage and which has not yet been condensed is fed to the second condenser stage 30b, which is configured as an upright shell and tube condenser. Alcohol condensing therein is also fed to the tank 32 to be further used. The residual exhaust vapour which is now mostly alcohol-free is drawn up by suction by the aforementioned compressor pump 38 which, as mentioned, also provides the desired vacuum in the upstream components. Here, the compressor pump 38 can be configured, for example, as a liquid ring vacuum pump, as a dry-running vacuum pump or as a jet pump. The residual exhaust vapour which has been compressed by the compressor pump 38 can be returned into the second condenser stage 30b to regulate the vacuum or fed to a separator or washer 40, a proportioned distribution between these two options also being possible.

The gases which evolve in the separator 40 and which are in particular the carbon dioxide outgassed in the degassing device are released into the atmosphere at reference numeral 42. The liquid components, which are separated in the separator 40, and which primarily comprise flavour components of the alcoholic beverage entrained by the alcohol exhaust vapours in the rectification column 26 as well as alcohol residues, are guided proportionately to an aroma heat exchanger 44 and removed from the plant at reference numeral 48 by a pump 46 or pumped back into the top of the separator 40.

The plant 10 shown in FIG. 1 is distinguished in that it comprises two closed circuits, namely a heating circuit 50 in which a heating medium circulates, and a cooling circuit 60 in which a cooling medium circulates. The thermal connection between the heating circuit 50 and the cooling circuit 60 is established, inter alia, by a heat pump 70 which pumps heat from the cooling circuit to the heating circuit in the manner of a reverse refrigerating machine.

To illustrate the operation of the two circuits, the circulation of the heating medium in the heating circuit 50 will firstly be considered, starting with its exit from the heat pump 70 at which it is at an elevated temperature. It should be noted here that the heating liquid can be represented by water, for example, which rules out a contamination of the liquid foodstuffs processed in the plant 10, for example during the occurrence of leaks.

The heating medium issuing at an elevated temperature from the heat pump 70 is circulated by a pump 52. Furthermore, provided in the region of pump 52 is an inlet 54, via which heating medium, i.e. water for example, can be fed into the heating circuit 50, for example if losses have occurred. In addition, associated with the heating circuit is a heating device 56 which can comprise a steam injector, for example.

Although during continuous operation, the thermal energy which is input into the heating circuit 50 by the heat pump is more than sufficient for compensating losses, when the plant 10 is started up, the heating medium must firstly be brought to a satisfactory temperature for correctly operating the evaporator 27. This task can be accomplished by the heating device 56, it being possible for the heating device 56 to be shut down again during continuous operation after the plant 10 has been started up.

The heating medium then passes through the second heat exchanger 18 described above, in which it releases some of its heat to the supplied alcoholic beverage to preheat it. Thereafter, the heating medium passes into the evaporator 27, whereupon vapour for operating the rectification column is generated in the evaporator by the heat released from the heating medium.

The heating medium then issues again from the evaporator 27 and is fed into a further heat exchanger 58 which can remove heat from the heating circuit 50. This heat exchanger 58 for removing heat from the heating circuit 50 is required for adjusting the overall energy balance of the plant 10. As already mentioned, additional thermal energy is input into the heating circuit 50 by the mechanical drive power of the heat pump 70. Since the heat transferred to the heating circuit 50 from the cooling circuit 60 remains in the plant and the beverage is also preferably removed from the plant at a temperature similar to that at which it was introduced, the additionally input thermal power of the heat pump 70 can be removed by the heat exchanger 58 to prevent the plant 10 from undesirably heating up. For this purpose, a source 59 of cooling water can be provided, for example, which provides the heat exchanger 58 with cooling water.

The heating medium, which has now released some of its heat in the various heat exchangers and in the evaporator, is fed back into the heat pump 70 at this point and is reheated. As mentioned, the energy required for heating the heating medium in the heating circuit 50 is removed from a cooling medium circulating in the cooling circuit 60, shown in dashed lines.

Also associated with the cooling circuit 60 is a source 62 of cooling medium, by which cooling medium can be fed into the cooling circuit 60. The cooling medium can also be water, which likewise affords the advantages mentioned above in connection with the heating medium. Provided in the cooling circuit 60 is a cooling medium pump 64 which keeps the cooling medium circulating.

The cooling medium cooled by the effect of the heat pump 70 is firstly guided to the aroma heat exchanger 44 described above where, as mentioned, it absorbs some of the heat of the liquid components of the residual exhaust vapour which have been separated in the separator 40. The cooling medium then successively flows through the second condenser stage 30b and the first condenser stage 30a where it absorbs the condensation heat of the exhaust vapour components which are condensing in these condenser stages.

The cooling medium heated in this manner is then returned to the heat pump 70, from which the heat absorbed in the last circulation is again transferred to the heating medium. Thus, it is seen that the heating circuit 50 and the cooling circuit 60 are both interconnected by the heat pump 70, as mentioned, and also, however, indirectly interconnected via the exhaust vapour which is condensing in the condenser arrangement 30 and which both releases its condensation heat to the cooling medium and has been previously evaporated by the thermal output of the heating medium which has released the heating medium in the evaporator 27.

It should be added that although the evaporator 27 can already evaporate dealcoholised beverage in order to operate the rectification column, for example in that it is configured as a simple sump evaporator in which the hot heating medium is guided in tubes through the sump of the rectification column 26 and there produces exhaust vapour, a source 72 for brewing water can also be provided for evaporation. Evaporating this brewing water in the evaporator 27 instead of the beverage from the sump of the rectification column 26 can extend the life and reduce the heating of the dealcoholised beverage, which has a positive effect on the sensory characteristics of the beverage.

To introduce the brewing water into the evaporator 27 and to circulate it therein, a brewing water pump 74 is also provided, it being possible to introduce the brewing water, provided by the brewing water source 72, in excess and to discharge it again via the outflow 76 to prevent a concentration of ingredients.

It is also mentioned that exemplary temperature values for the heating medium are 60° C. when it issues from the heat pump and 50° C. when it enters the heat pump, while the cooling medium can enter the heat pump at 20° C. and can issue therefrom having been cooled to 15° C.

Figure 2:
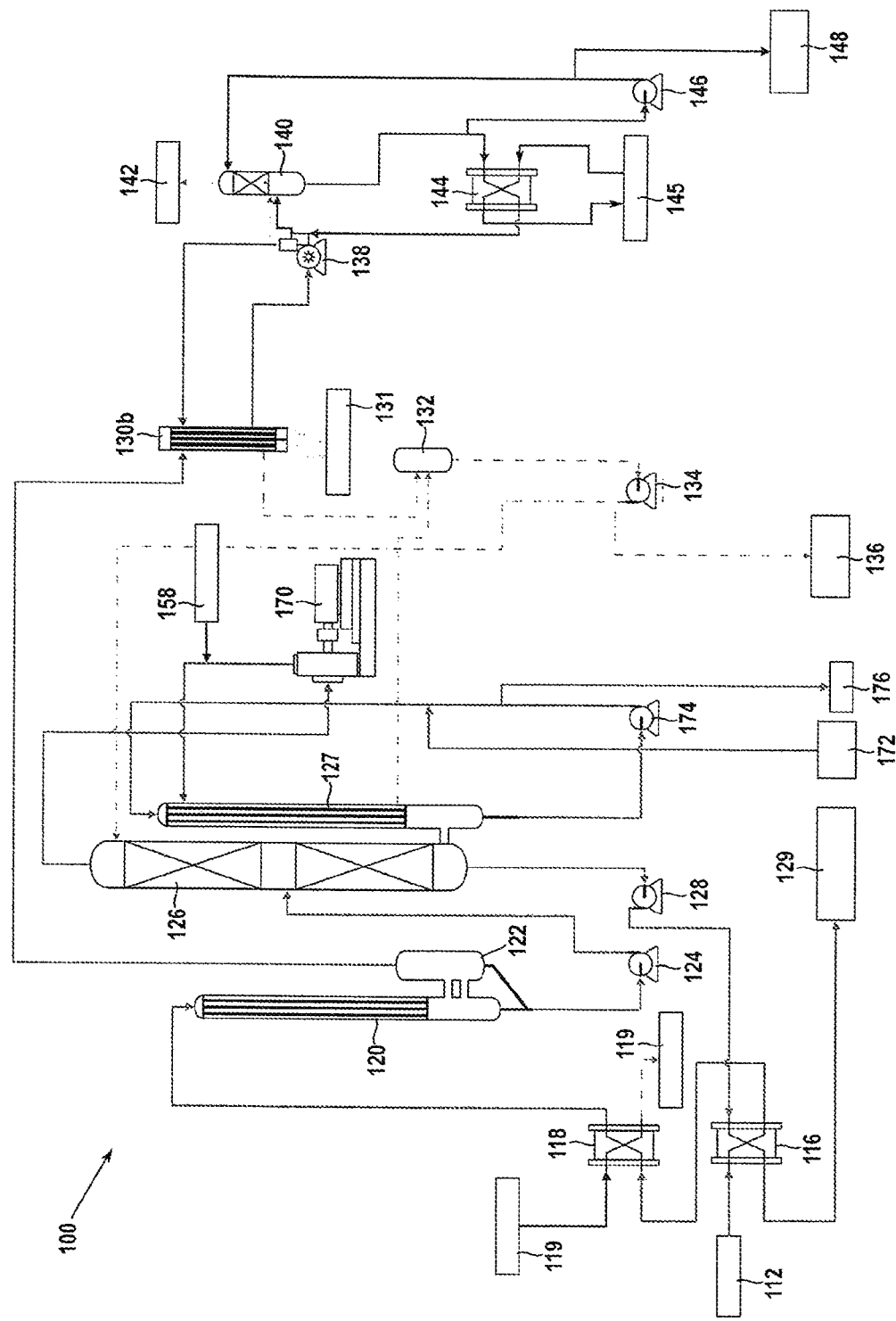
FIG. 2 shows a second embodiment of a plant according to the invention.

FIG. 2 shows a second embodiment of a plant according to the invention which is denoted very generally by reference numeral 100. Many components of plant 100 correspond to those of plant 10 of the first embodiment and have been given the same reference numerals, increased by 100. In contrast to the first embodiment from FIG. 1, plant 100 of the second embodiment does not comprise the two circuits 50 and 60, but comprises a mechanical exhaust vapour compressor 170 which directly compresses the exhaust vapour from the rectification column 126.

Similarly to the first embodiment, an alcoholic beverage is introduced into the plant 100 at reference numeral 112 and is preheated by two heat exchangers 116 and 118. In this case, unlike in the first embodiment, the second heat exchanger 118 is operated by means of a vapour source 119. The alcoholic beverage is then fed into the degassing device 120 with its associated separator 122, the operation of which corresponds to that of FIG. 1.

The beverage which has been degassed thus is fed into the rectification column 126, reference being made to the description of column 26 from FIG. 1 for the description of column 126. While the dealcoholised beverage in plant 100 from FIG. 2 is removed from the plant 100 at reference numeral 129 in a similar manner to plant 10 of FIG. 1, the exhaust vapour which collects in the top of the rectification column 126 is fed to the mechanical exhaust vapour compressor 170, which assumes the function of the heat pump in plant 100. Furthermore, also provided here is the heating device 158 which, in a manner similar to that described above, can comprise a live steam feed and can be used to start up the plant.

In this case, the mechanical exhaust vapour compressor 170 can be configured as a radial ventilator, a turbocompressor or as a Roots blower, and it increases the energy content of the exhaust vapour by mechanical compression. The exhaust vapour which is thus compressed and concentrated in terms of energy is then fed as a heating medium to the evaporator 127, where it both generates the vapour required for operating the rectification column and itself condenses. In this way, the evaporator 127 in plant 100 from FIG. 2 also assumes the task of a condenser.

Analogously to the exhaust vapour which is condensed in the first condenser stage 30a in the embodiment of FIG. 1, the exhaust vapour which is condensed in the evaporator 127 is fed into a tank 132, from where it can be removed at reference numeral 136 by means of a pump 134 or fed into the top of the rectification column 126 again.

Since, as mentioned, the exhaust vapour from the rectification column 126 is condensed in the evaporator 127, the gas which has been outgassed in the degassing device 120 is fed alone to the upright shell and tube condenser 130b, which corresponds to the second condenser stage 30b from FIG. 1. This upright shell and tube condenser 130b is cooled by a source 131 of cooling water, and condensate resulting in the condenser is also fed into the tank 132. Connected to the upright shell and tube condenser 130b, analogously to plant 10 from FIG. 1, are a compressor pump 138, a separator 140 from which gas is released into the atmosphere at reference numeral 142, and an aroma heat exchanger 144 with an aroma pump 146, by which the condensed aromas can be removed from plant 100 at reference numeral 148. It should merely be noted that the aroma heat exchanger 144 also has to be cooled by an external cooling source 145, because as mentioned, there is no central cooling circuit in plant 100.

Although plant 100, unlike plant 10 from FIG. 1, does not have a closed heating circuit or cooling circuit, but additional energy for the heating and cooling of components of the plant must be expended by the vapour source 119 and by the two cooling water sources 131 and 145 instead, plant 100 can operate in a more energy-efficient manner than plant 10 from FIG. 1, especially in large plants having a high beverage throughput rate, due to the outstanding efficiency of the mechanical exhaust vapour compressor 170.

The invention claimed is:

1. A plant for dealcoholising alcoholic beverages, comprising:
   a rectification column having at least one inlet for the alcoholic beverage, a sump and a top, the rectification column being operable such that dealcoholised beverage is removable from the sump and exhaust vapour is removable from the top;
   at least one evaporator which is configured to supply the rectification column with vapour; and
   a condenser arrangement for condensing the exhaust vapour removed from the top of the rectification column at least in part;
   a heat pump which can operate the at least one evaporator and the condenser arrangement; and
   a heating circuit containing a heating medium for heating the at least one evaporator and a cooling circuit containing a cooling medium for cooling the condenser arrangement, the heat pump being operable so as to transfer heat from the cooling medium leaving the condenser arrangement to the heating medium leaving the at least one evaporator,
   wherein associated with the at least one of the heating circuit and the cooling circuit is at least one first heat exchanger which can remove heat from the plant,
   wherein associated with at least one of the heat pump, the heating circuit and the cooling circuit is a heating device,
   wherein the at least one first heat exchanger and the heating device are associated with the same heating circuit or cooling circuit.

2. The plant according to claim 1 further comprising a compressor pump which is arranged to compress residual exhaust vapour issuing in gas form from the condenser arrangement.

3. The plant according to claim 2, wherein arranged in the flow direction of the residual exhaust vapour downstream of the compressor pump is a separator for separating liquid components of the residual exhaust vapour, and an aroma heat exchanger which is arranged to transfer heat from the liquid components of the residual exhaust vapour to the cooling medium.

4. The plant according to claim 1 further comprising in the flow direction of the alcoholic beverage upstream of the inlet of the rectification column at least one second heat exchanger for preheating the alcoholic beverage is arranged to transfer heat from the dealcoholised beverage to the alcoholic beverage, and a third heat exchanger which is configured to transfer heat from the heating medium to the alcoholic beverage.

5. The plant according claim 1, wherein provided in the flow direction of the alcoholic beverage upstream of the inlet of the rectification column is a degassing device which comprises a separator, the degassing device being connected to the condenser arrangement such that the gases outgassed from the alcoholic beverage can be fed together with the exhaust vapour removed from the top of the rectification column to the condenser arrangement.

6. The plant according to claim 5, wherein the degassing device comprises a falling film tube bundle which can be heated by another heating device.

7. The plant according to claim 1, wherein the condenser arrangement comprises at least one horizontally arranged shell and tube condenser and/or at least one upright shell and tube condenser.

8. The plant according to claim 7, wherein the condenser arrangement comprises firstly a horizontally arranged shell and tube condenser and then an upright shell and tube condenser in the flow direction of the exhaust vapour, the cooling medium firstly flowing through the upright shell and tube condenser and then through the horizontal shell and tube condenser.

* * * * *